(No Model.)
L. LARSEN.
AXLE BOX.
No. 371,848. Patented Oct. 18, 1887.
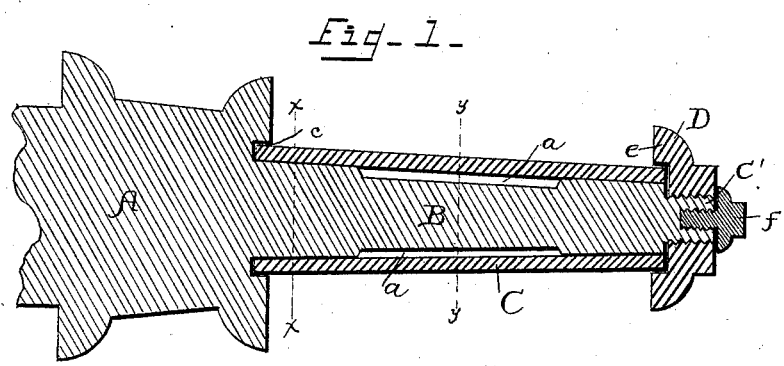
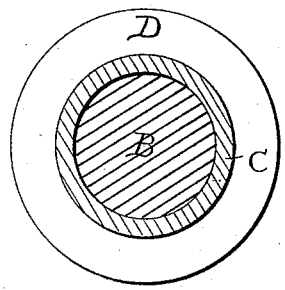    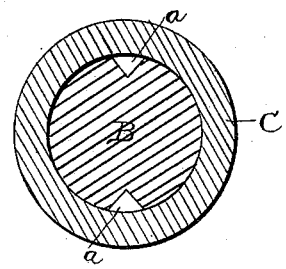
WITNESSES
Wm. J. Littell
M. A. Acker
INVENTOR
Lars Larsen,
by J. R. Littell,
Attorney.
N. PETERS, Photo-Lithographer, Washington, D. C.

UNITED STATES PATENT OFFICE.

LARS LARSEN, OF OMAHA, NEBRASKA.

AXLE-BOX.

SPECIFICATION forming part of Letters Patent No. 371,848, dated October 18, 1887.

Application filed November 9, 1886. Serial No. 218,417. (No model.)

*To all whom it may concern:*

Be it known that I, LARS LARSEN, a citizen of the United States, residing at Omaha, in the county of Douglas and State of Nebraska, have invented certain new and useful Improvements in Axle-Boxes; and I do hereby declare that the following is a full, clear, and exact description of the invention, which will enable others skilled in the art to which it appertains to make and use the same.

My invention relates to axle-boxes, the object of the invention being to provide a box which shall be simple in its construction, strong and durable, cheap to manufacture, and one that will effectually exclude dust from the axle-skein.

The invention consists in the features of construction and combinations of parts, hereinafter fully described, and pointed out in the claim.

In the drawings, Figure 1 is a longitudinal vertical section of my improvement. Fig. 2 is a detail cross-section of the same on the line $x\ x$ of Fig. 1, and Fig. 3 is a detail cross-section on the line $y\ y$ of Fig. 1.

Corresponding parts in the several figures are denoted by the same letters of reference.

Referring to the drawings, A represents the axle, from which projects a tapering axle-skein, B. The axle-skein B is formed with two or more longitudinal grooves, $a$, which are adapted to receive and retain a suitable lubricant. The axle A is formed at the junction of the skein with it with a circumferential groove, $c$, somewhat larger than the inner end of the skein in circumference, for a purpose which will be more fully explained.

C represents the box, which is fitted upon the axle-skein and is bored or reamed out to fit the latter. The inner end of this box extends into the groove $c$, thereby preventing dust from entering the box at its inner end.

At the outer end of the axle-skein B is formed a threaded projection, C', smaller than the skein, and adapted to receive a nut, D, which has a projecting flange, $e$, fitting over and inclosing the outer end of the axle-box. The nut D is held in position upon the threaded projection against detachment by means of a screw, $f$, which engages a threaded opening in the projection C' and bears against the outer face of the nut.

The improvement before described is simple in its construction, cheap to manufacture, strong and durable, and thoroughly effective for the purposes intended.

I am aware that an axle-spindle has heretofore been provided with a screw-recess in its end, with a washer inserted on said end, and a jam-screw secured in said recess and inclosed in an oil-cup nut; also, that an axle-box has been constructed comprising a spindle having a circularly-recessed shoulder, and a nut having enlarged inner and outer lips and shoulders.

I am further aware that an improved hub-attaching device comprising an axle-box, a flexible washer and a nut screwed on the end of the axle and bearing against said washer has been heretofore used, and that it is not novel to provide an improved bearing consisting of four (more or less) iron or steel bearings on the axle-skein upon which bears the axle-box, and hence I do not, therefore, broadly claim the above features of construction.

Having thus fully described my invention, what I claim as new, and desire to secure by Letters Patent, is—

The combination of the axle having the grooved skein and provided with a groove at the point of junction of said axle and skein, the long tapering cylindrical box having its inner edge fitting in said groove, the nut fitted on a threaded end of said skein and having a projecting flange fitting over and inclosing the outer edge of said axle-box, and the screw secured in said end of the skein and bearing against the outer surface of said nut for retaining the same in position, substantially as shown and described.

In testimony whereof I affix my signature in presence of two witnesses.

LARS LARSEN.

Witnesses:
V. M. MACKEY,
FRANK BARKER.